United States Patent
Murakami et al.

(10) Patent No.: US 7,071,655 B2
(45) Date of Patent: Jul. 4, 2006

(54) AC ADAPTER HAVING A FUNCTION FOR LOWERING AND HEIGHTENING AN ADAPTER VOLTAGE

(75) Inventors: Kouji Murakami, Iizuka (JP); Hidetoshi Hamai, Iizuka (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/789,498

(22) Filed: Feb. 26, 2004

(65) Prior Publication Data
US 2005/0007069 A1  Jan. 13, 2005

(30) Foreign Application Priority Data
Jul. 9, 2003  (JP)  ............... 2003-272169

(51) Int. Cl.
*H02J 7/04* (2006.01)

(52) U.S. Cl. ...................... 320/149; 320/160

(58) Field of Classification Search ................ 320/149, 320/160, 146
See application file for complete search history.

(56) References Cited

U.S. PATENT DOCUMENTS

| | | | | |
|---|---|---|---|---|
| 5,442,274 A | * | 8/1995 | Tamai | 320/146 |
| 5,465,039 A | * | 11/1995 | Narita et al. | 320/164 |
| 5,654,622 A | * | 8/1997 | Toya et al. | 320/129 |
| 6,246,890 B1 | * | 6/2001 | Sato et al. | 455/573 |

* cited by examiner

*Primary Examiner*—Adolf Deneke Berhane
*Assistant Examiner*—Robert Grant
(74) *Attorney, Agent, or Firm*—Frishauf, Holtz, Goodman & Chick, P.C.

(57) ABSTRACT

Disposed in a secondary side circuit of an AC adapter (10A), a $-\Delta I$ detection circuit (45) detects that a charging current ($I_c$) lowers less than a set current value to produce a detected signal. A voltage control circuit (42A) operates so as to repeat the steps of gradually lowering an adapter voltage ($V_{ADP}$) and of heightening the adapter voltage in response to the detected signal.

7 Claims, 6 Drawing Sheets

AC ADAPTER HAVING A FUNCTION FOR LOWERING AND HEIGHTENING AN ADAPTER VOLTAGE

This application claims priority to prior Japanese application JP 2003-272169, the disclosure of which is incorporated herein by reference.

BACKGROUND OF THE INVENTION

This invention relates to an AC adapter and a method of charging a secondary battery using the AC adapter.

An AC adapter of the type described is used for charging a secondary battery which is included in or mounted on a main body such as a portable telephone set. The secondary battery may be a lithium ion cell. The AC adapter is connected to a main body through a cable having a resistor. The AC adapter has a cathode and an anode and generates an adapter voltage therebetween.

On the other hand, the main body comprises a check diode, a charge control element such as a transistor, a secondary battery, and a charge control circuit. The charge control circuit controls a charging of the secondary battery by controlling the charge control element. The charge control circuit comprises a regulator therein. The secondary battery generates a battery voltage (a charging voltage). The AC adapter has a V-I characteristic which is a constant current/constant voltage characteristic.

It will be assumed that a charging control is made to the secondary battery of the main body. Attention will be directed to a constant voltage. In this event, the charging voltage has poor precision. This is because there are a cable loss, a loss due to a contact resistor, Vf of the check diode, and so on between the AC adapter and the secondary battery. For this purpose, the charge control circuit comprises the regulator in the manner which is described above.

The adapter voltage of the AC adapter is on the high side so as to supply a voltage enable to charge although factors generating the above-mentioned voltage loss varies widely.

In such as AC adapter, it is necessary to electrically isolate and separate the primary side circuit from the secondary side circuit in order to prevent an accident such as an electric shock. As means for electrically isolating and separating, a photocoupler or an isolation transformer is generally used. In addition, it is necessary for the AC adapter to carry out a constant current control and a constant voltage control. For this purpose, it is necessary to feed a variation of a current flowing the secondary side circuit as a constant current control signal and a variation of a secondary output voltage as a constant voltage control signal back to the primary side circuit. Under the circumstances, the constant current control signal and the constant voltage control signal are returned (fed) from the secondary side circuit back to the primary side circuit through a photocoupler.

In the manner which will later be described in conjunction with FIG. 3, a conventional AC adapter circuit will be described in order to facilitate an understanding of the present invention. The AC adapter includes, as a primary side circuit, a primary rectifying and smoothing circuit, a primary winding of a transformer, a switching control circuit, and a switching element.

Supplied from an AC power supply, an input AC voltage is rectified and smoothed by the primary rectifying and smoothing circuit to convert it into an input DC voltage. The input DC voltage is applied to the primary winding of the transformer to turn the input DC voltage on and off by the switching element. Turning on and off of the switching element is controlled by an on-off control signal supplied from the switching control circuit.

In addition, the illustrated AC adapter includes, as a secondary side circuit, a secondary winding of the transformer and a secondary rectifying and smoothing circuit. Induced in the secondary winding of the transformer, an AC voltage is rectified and smoothed by the secondary rectifying and smoothing circuit to produce an adapter voltage.

The secondary side circuit comprises a constant voltage control circuit, a constant current control circuit, and a reference voltage generating circuit. The constant voltage control circuit detects a variation of the adapter voltage to produce a constant voltage control signal. The constant voltage control signal is fed back to the switching control circuit disposed in the primary side circuit as a feedback signal through an OR gate and a photocoupler. The constant current control circuit detects a current flowing in the secondary side circuit to produce a constant current control signal. The constant current control signal is also fed back to the switching control circuit disposed in the primary side circuit as the feedback signal through the OR gate and the photocoupler. The reference voltage generating circuit is for supplying a reference voltage to the constant voltage control circuit and to the constant current control circuit.

The anode is connected to ends of first and second resistors. Another end of the first resistor and another end of the second resistor are connected to the constant current control circuit. Between the cathode and the other end of the second resistor, third and fourth resistors for dividing the adapter voltage are connected. The reference voltage generating circuit is connected to the cathode. Between the reference voltage generating circuit and the other end of the second resistor, fifth and sixth resistors for dividing the reference voltage are connected. From a connection point between the fifth and the sixth resistors, a divided voltage of the reference voltage is supplied to the constant current control circuit.

On the transformer, an auxiliary winding is wound. The auxiliary winging has an end connected to the switching element, the primary rectifying and smoothing circuit, and the switching control circuit. The auxiliary winding NB has another end connected to the switching control circuit and a collector of a phototransistor of the photocoupler.

At any rate, the conventional AC adapter carries out a constant voltage control for using a fixed reference voltage.

While the battery voltage is low, the secondary battery is charged at a constant charging current. When the battery voltage reaches a predetermined voltage, a constant voltage charging is carried out. The adapter voltage is always higher than the battery voltage.

The conventional AC adapter is disadvantageous in that it generates a high voltage difference between the adapter voltage and the battery voltage in the constant voltage charging region and it results in generating heat in the charging control transistor (the charging control element) within the main body.

SUMMARY OF THE INVENTION

It is therefore an object of the present invention to provide an AC adapter which is capable of restraining generation of heat of a charge control element within a main body.

Other objects of this invention will become clear as the description proceeds.

On describing the gist of an aspect of this invention, it is possible to be understood that an AC adapter is for use in charging a secondary battery which is contained in or mounted on a main body. The AC adapter comprises a primary side circuit for turning, by using a switching element, an input DC voltage applied to a primary winding of a transformer on and off, a secondary side circuit for rectifying and smoothing an AC voltage induced in a secondary winding of the transformer to produce an adapter voltage, a voltage control circuit for detecting a variation of the adapter voltage to produce a voltage control signal, a constant current control circuit for detecting a charging current flowing through the secondary side circuit to produce a constant current control signal, a photocoupler for feeding the voltage control signal and the constant current control signal as a feedback signal back to the primary side circuit, and a switching control circuit for controlling, in response to the feedback signal, on and off of the switching element.

According to the aspect of this invention, the above-mentioned AC adapter further comprises a detection arrangement, disposed in the secondary side circuit, for detecting that the charging current decreases less than a set current value to produce a detected signal. Whereby, the above-mentioned voltage control circuit operates so as to repeatedly operations comprising the steps of gradually lowering the adapter voltage and of heightening, in response to the detected signal, the adapter voltage by a predetermined voltage. In the above-mentioned AC adapter, the main body may comprise, for example, a portable telephone set. The predetermined voltage may preferably be equal to 100 millivolts. The AC adapter may further comprising a reference voltage generating circuit for supplying a reference voltage to the voltage control circuit. The voltage control circuit controls the adapter voltage so as to change the adapter voltage by changing the reference voltage by the reference voltage generating circuit.

On describing the gist of another aspect of this invention, it is possible to be understood that a method is for charging, by using an adapter voltage, a secondary battery which is contained in or mounted on a main body. The method comprises the steps of a) gradually lowering said adapter voltage, of b) heightening the adapter voltage by a predetermined voltage when a charging current flowing through the secondary battery is less than a set current value, and of c) repeating the steps a) and b).

DESCRIPTION OF THE PREFERRED EMBODIMENT

Figure 1:
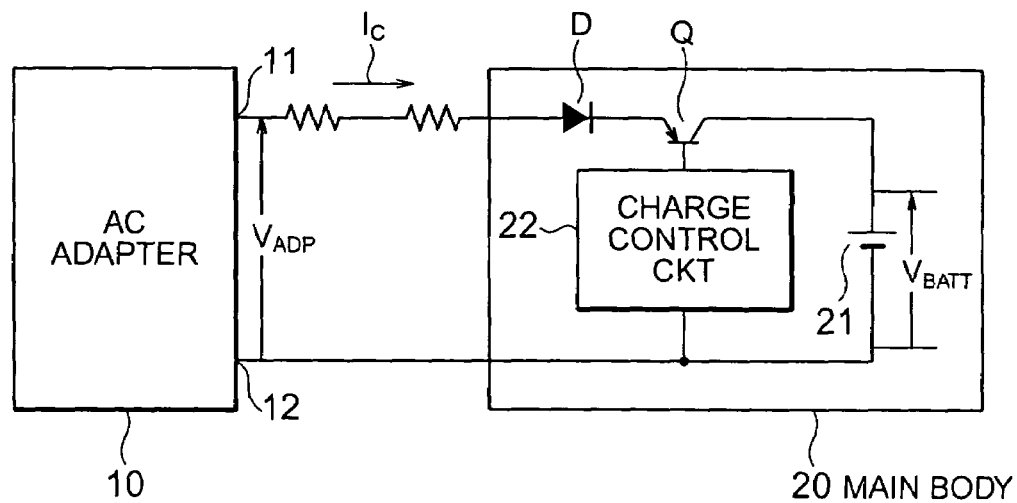
FIG. 1 is a block diagram showing a state where an AC adapter is connected to a main body containing a secondary battery.

FIG. 1 shows a state where an AC adapter 10 is connected to a main body 20 such as a portable telephone set. The AC adapter 10 is connected to the main body 20 through a cable having a resistor. The AC adapter 10 has a cathode 11 and an anode 12 and generates an adapter voltage $V_{ADP}$ therebetween.

On the other hand, the main body 20 comprises a check diode D, a charge control element Q such as a transistor, a secondary battery 21, and a charge control circuit 22. The charge control circuit 22 controls a charging of the secondary battery 21 by controlling the charge control element Q. The charge control circuit 22 comprises a regulator (not shown) therein. The secondary battery 21 generates a battery voltage (a charging voltage) $V_{BATT}$.

Figure 2:
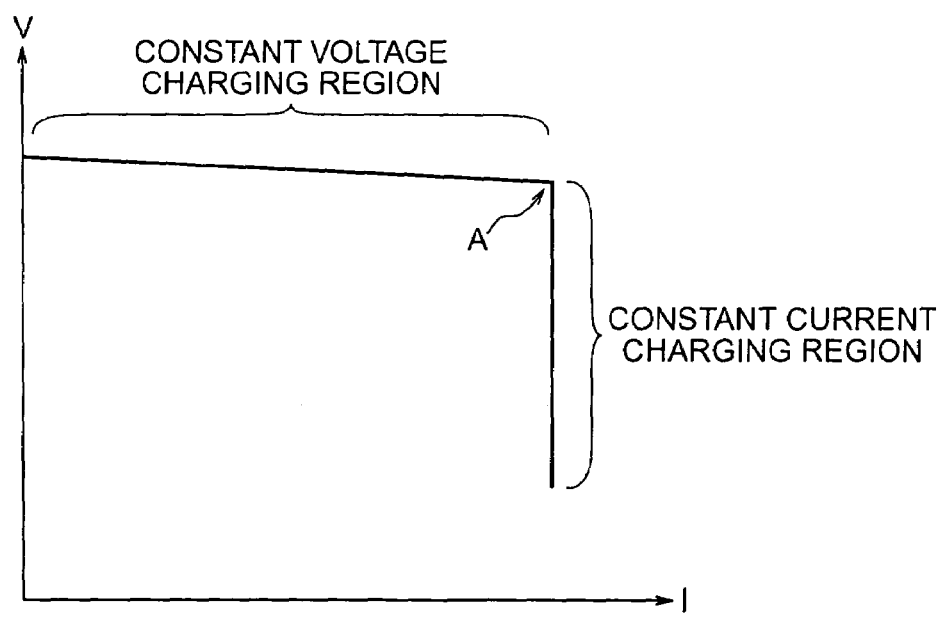
FIG. 2 is a characteristic view showing a V-I characteristic of the AC adapter.

As shown in FIG. 2, the AC adapter has a V-I characteristic which is a constant current/constant voltage characteristic.

It will be assumed that a charging control is made to the secondary battery 21 of the main body 20. Attention will be directed to a constant voltage. In this event, the charging voltage $V_{BATT}$ has poor precision. This is because there are a cable loss, a loss due to a contact resistor, Vf of the check diode D, and so on between the AC adapter 10 and the secondary battery 21, in the manner which is apparent from FIG. 1. For this purpose, the charge control circuit 22 comprises the regulator in the manner which is described above.

The adapter voltage $V_{ADP}$ of the AC adapter 10 is on the high side so as to supply a voltage enable to charge although factors generating the above-mentioned voltage loss varies widely.

In such as AC adapter, it is necessary to electrically isolate and separate the primary side circuit from the secondary side circuit in order to prevent an accident such as an electric shock. As means for electrically isolating and separating, a photocoupler or an isolation transformer is generally used. In addition, it is necessary for the AC adapter to carry out a constant current control and a constant voltage control. For this purpose, it is necessary to feed a variation of a current flowing the secondary side circuit as a constant current control signal and a variation of a secondary output voltage as a constant voltage control signal back to the primary side circuit. Under the circumstances, the constant current control signal and the constant voltage control signal are returned (fed) from the secondary side circuit back to the primary side circuit through a photocoupler.

Figure 3:
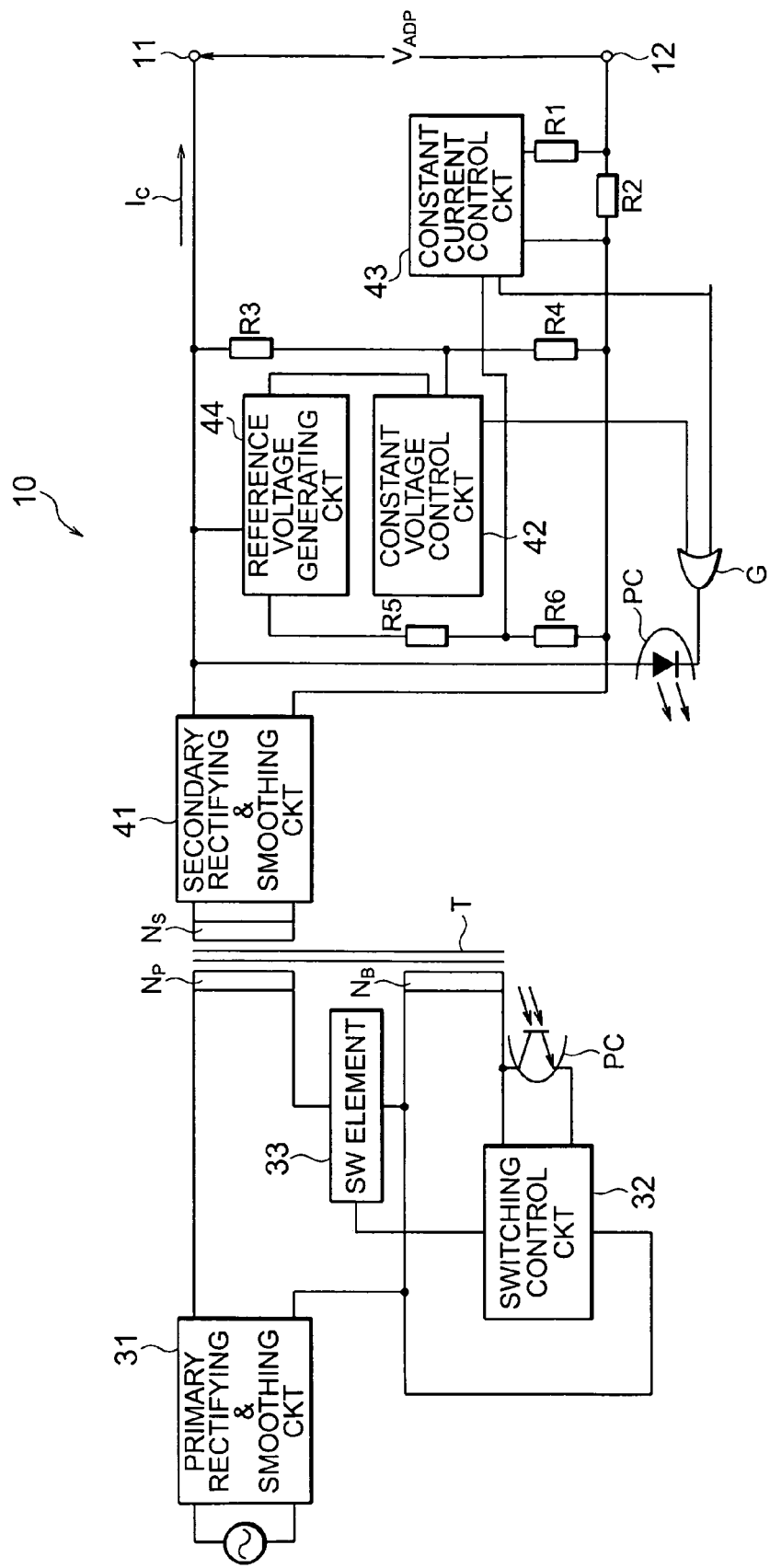
FIG. 3 is a block diagram of a conventional AC adapter.

Referring to FIG. 3, a conventional AC adapter circuit will be described in order to facilitate an understanding of the present invention. The illustrated AC adapter includes, as a primary side circuit, a primary rectifying and smoothing circuit 31, a primary winding Np of a transformer T, a switching control circuit 32, and a switching (SW) element 33.

Supplied from an AC power supply, an input AC voltage is rectified and smoothed by the primary rectifying and smoothing circuit 31 to convert it into an input DC voltage. The input DC voltage is applied to the primary winding Np of the transformer T to turn the input DC voltage on and off by the switching element 33. Turning on and off of the switching element 33 is controlled by an on-off control signal supplied from the switching control circuit 32.

In addition, the illustrated AC adapter includes, as a secondary side circuit, a secondary winding Ns of the transformer T and a secondary rectifying and smoothing circuit 41. Induced in the secondary winding Ns of the transformer T, an AC voltage is rectified and smoothed by the secondary rectifying and smoothing circuit 41 to produce an adapter voltage $V_{ADP}$.

The secondary side circuit comprises a constant voltage control circuit 42, a constant current control circuit 43, and a reference voltage generating circuit 44. The constant voltage control circuit 42 detects a variation of the adapter voltage $V_{ADP}$ to produce a constant voltage control signal. The constant voltage control signal is fed back to the switching control circuit 32 disposed in the primary side circuit as a feedback signal through an OR gate G and a photocoupler PC. The constant current control circuit 43 detects a current flowing in the secondary side circuit to produce a constant current control signal. The constant current control signal is also fed back to the switching control circuit 32 disposed in the primary side circuit as the feedback signal through the OR gate G and the photocoupler PC. The reference voltage generating circuit 44 is for supplying a reference voltage to the constant voltage control circuit 42 and to the constant current control circuit 43.

The anode 12 is connected to ends of first and second resistors R1 and R2. Another end of the first resistor R1 and another end of the second resistor R2 are connected to the constant current control circuit 43. Between the cathode 11 and the other end of the second resistor R2, third and fourth resistors R3 and R4 for dividing the adapter voltage $V_{ADP}$ are connected. The reference voltage generating circuit 44 is connected to the cathode 11. Between the reference voltage generating circuit 44 and the other end of the second resistor R2, fifth and sixth resistors R5 and R6 for dividing the reference voltage are connected. From a connection point between the fifth and the sixth resistors R5 and R6, a divided voltage of the reference voltage is supplied to the constant current control circuit 43.

On the transformer T, an auxiliary winding NB is wound. The auxiliary winging $N_B$ has an end connected to the switching element 33, the primary rectifying and smoothing circuit 31, and the switching control circuit 32. The auxiliary winding $N_B$ has another end connected to the switching control circuit 32 and a collector of a phototransistor of the photocoupler PC.

At any rate, the conventional AC adapter 10 carries out a constant voltage control for using a fixed reference voltage.

Figure 4:
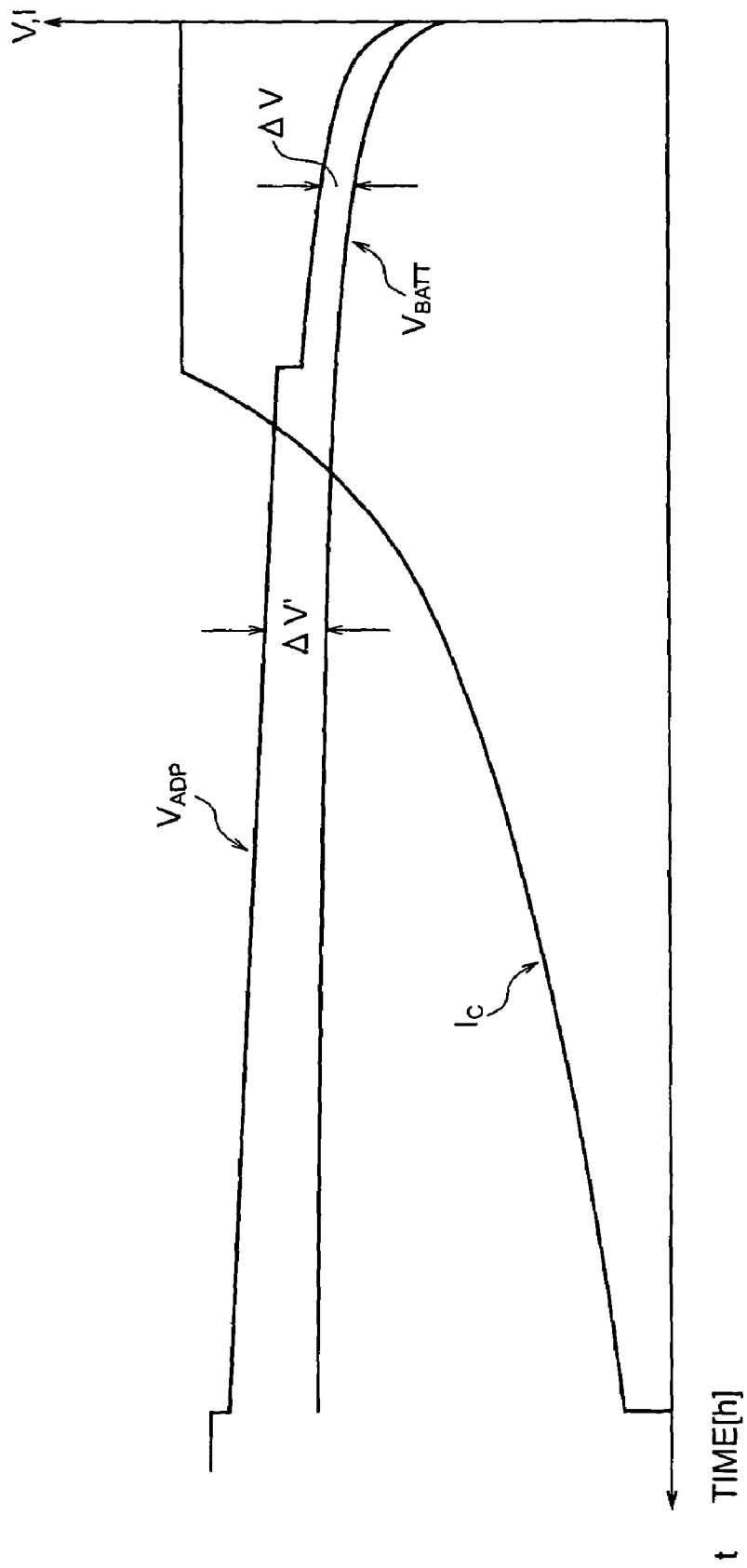
FIG. 4 is a view showing a charging characteristic of the conventional AC adapter illustrated in FIG. 3.

FIG. 4 shows a charging characteristic of the conventional AC adapter 10. In FIG. 4, the abscissa represents a time t [hour] and the ordinate represents a voltage V and a current 1. While the battery voltage $V_{BATT}$ is low, the secondary battery 21 (FIG. 1) is charged at a constant charging current Ic. When the battery voltage $V_{BATT}$ reaches a predetermined voltage, a constant voltage charging is carried out. As shown in FIG. 4, the adapter voltage $V_{ADP}$ is always higher than the battery voltage $V_{BATT}$.

However, the conventional AC adapter 10 is disadvantageous in that it generates a high voltage difference $\Delta V'$ between the adapter voltage $V_{ADP}$ and the battery voltage $V_{BATT}$ in the constant voltage charging region and it results in generating heat in the charging control transistor (the charging control element) Q within the main body 20. In addition, a jump voltage ($\Delta V'-\Delta V$) is equal to about 0.5 volts although it is different among types of machine and products.

Figure 5A:
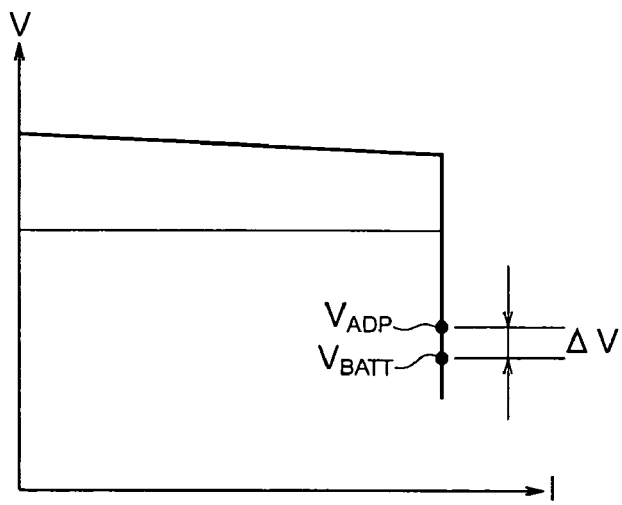
FIGS. 5A through 5C are views for use in describing a reason where a jump of a voltage occurs on changing from a constant current charging region to a constant voltage charging region in the conventional AC adapter illustrated in FIG. 3.
Figure 5B:
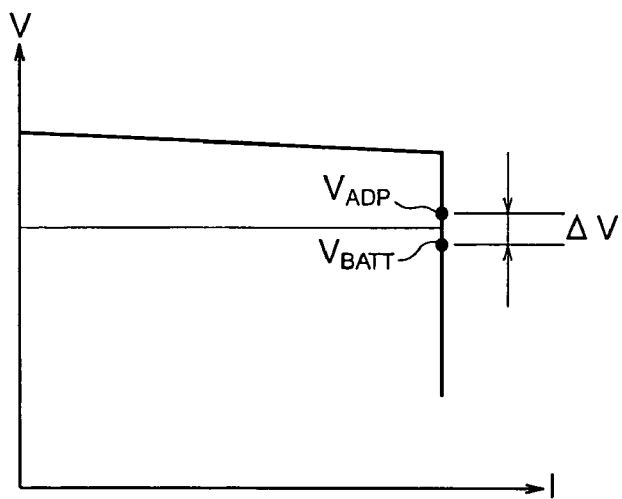
Figure 5C:
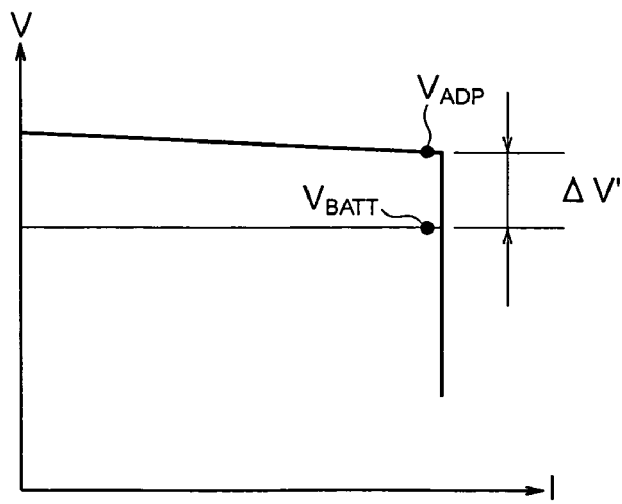

Referring now to FIGS. 5A–5C, the description will be made as regards reasons where a jump of the voltage occurs on switching from the constant current charging state into the constant voltage charging state. In FIGS. 5A–5C, a V-I characteristic of the AC adapter 10 is indicted by a thick solid line while a V-I characteristic of the charge control circuit 22 is indicated by a thin solid line.

As shown in FIG. 5A, when the battery voltage $V_{BATT}$ is low, the battery voltage $V_{BATT}$ and the adapter voltage $V_{ADP}$ gradually rise with the lowest necessary voltage difference $\Delta V$ left therebetween.

As shown in FIG. 5B, until the battery voltage $V_{BATT}$ reaches a corner of the V-I characteristic of the charge control circuit 22 (a time instant where a charging control mode switches from a constant current charging control mode to a constant voltage control mode) because a charging goes, the battery voltage $V_{BATT}$ and the adapter voltage $V_{ADP}$ gradually rise with the lowest necessary voltage difference $\Delta V$ left therebetween.

As shown in FIG. 5C, it will be assumed that the battery voltage $V_{BATT}$ enters in a constant voltage portion of the V-I characteristic of the charge control circuit 22. In this event, inasmuch as the charging current Ic of the AC adapter 10 is equal to the charging current flowing through the secondary battery 21, the adapter voltage $V_{ADP}$ also enters in the constant voltage charging region of the V-I characteristic of the AC adapter 10 naturally. As a result, the adapter voltage $V_{ADP}$ jumps to a point illustrated in FIG. 5C from FIG. 5B.

This is the reason that the conventional AC adapter 10 generates the high voltage difference $\Delta V'$ between the adapter voltage $V_{ADP}$ and the battery voltage $V_{BATT}$ in the constant voltage charging region, as mentioned in the preamble of the instant specification.

Specifically, a point A illustrated in FIG. 2 (that is a point changing from the constant current charging region to the constant voltage charging region) is a point where generation of heat in the charging control transistor (the charging control element) becomes the maximum because the charging current Ic is the maximum.

Figure 6:
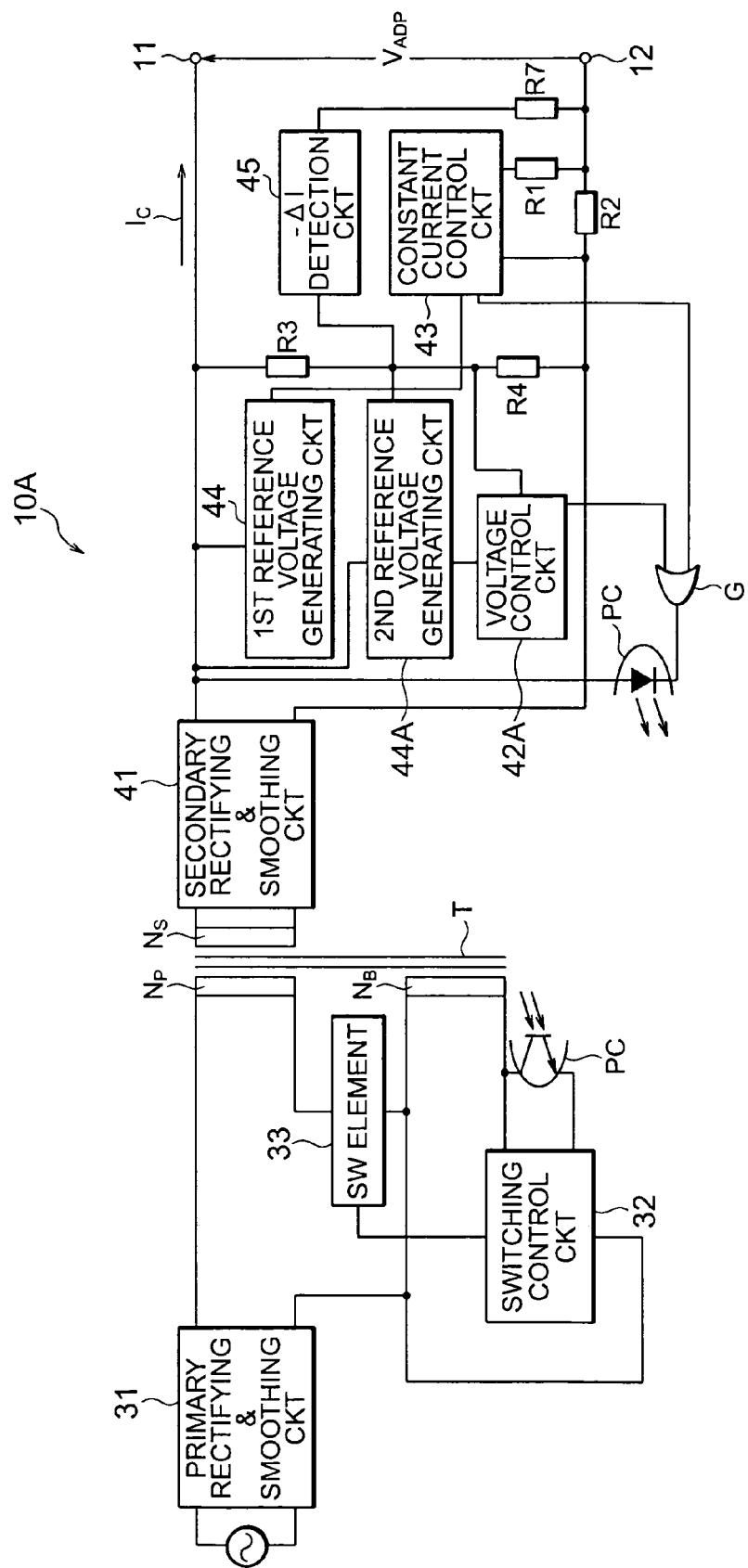
FIG. 6 is a block diagram of an AC adapter according to a preferred embodiment of this invention.

Referring to FIG. 6, the description will proceed to an AC adapter 10A according to a preferred embodiment of this invention. The illustrated AC adapter 10A is similar in structure and operation to the conventional AC adapter illustrated in FIG. 3 except that a second reference voltage generating circuit 44A in addition to the conventional reference voltage generating circuit 44 (which will be referred to as a first reference voltage generating circuit) is used, a voltage control circuit 42A is used in lieu of the constant voltage control circuit 42, and a $-\Delta I$ detection circuit 45 is added. Accordingly, similar reference symbols are attached to those having functions similar to components illustrated in FIG. 3 and description thereto is omitted in order to simplify the description.

The second reference voltage generating circuit 44A carries out, as a basic operation in a charging state, voltage regulation so as to gradually lower a second reference voltage. Responsive to a drop of the second reference voltage, the voltage control circuit 42A controls the adapter voltage $V_{ADP}$ so as to lower the adapter voltage $V_{ADP}$.

The $-\Delta I$ detection circuit 45 is connected to the anode 12 via a seventh resistor R7. The $-\Delta I$ detection circuit 45 detects that the charging current Ic is less than a set current value to supply a detected signal to the second reference voltage generating circuit 44A.

Responsive to the detected signal, the second reference voltage generating circuit 44A heightens the second reference voltage once by a predetermined voltage. Responsive to a rise of the second reference voltage, the voltage control circuit 42A operates so as to heighten the adapter voltage $V_{ADP}$ by the predetermined voltage once.

Figure 7:
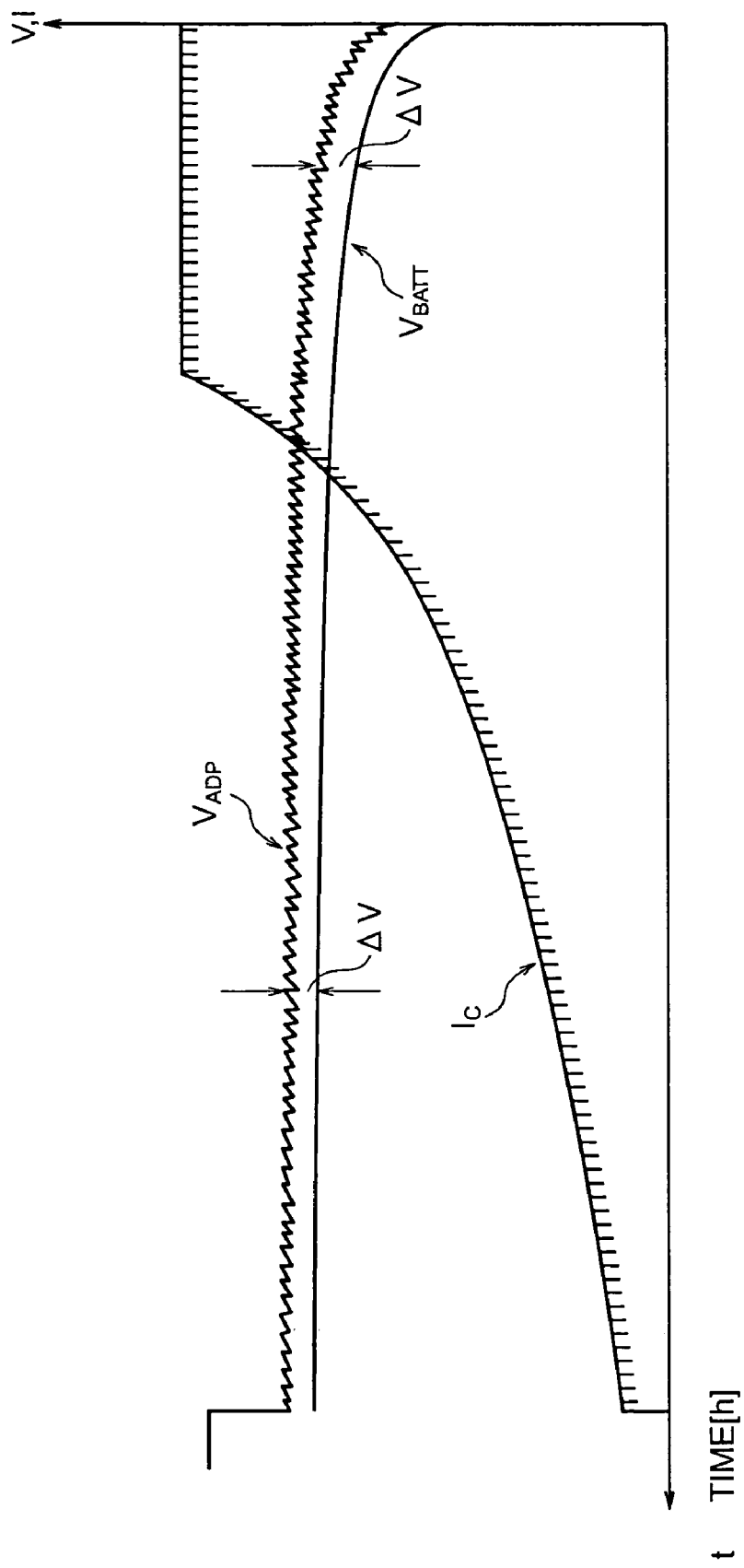
FIG. 7 is a view showing a charging characteristic of the AC adapter illustrated in FIG. 6.

Referring to FIG. 7 in addition to FIG. 6, the description will be made as regards operation of the AC adapter 10A. In FIG. 7, the abscissa represents a time t [hour] and the ordinate represents a voltage V and a current I.

In the constant current charging region, the constant current control circuit 43 always monitors the charging current Ic. The constant current control circuit 43 produces the constant current control circuit so that the charging current Ic is constant. The constant current control signal is fed as the feedback signal back to the switching control circuit 32 of the primary side circuit through the OR gate G and the photocoupler PC.

Under the circumstances, the voltage control circuit 42A gradually lowers the adapter voltage $V_{ADP}$ in response to the second reference voltage supplied from the second reference voltage generating circuit 44A. In this event, the charging current Ic maintains at a constant value. It will be assumed that a voltage difference ($V_{ADP}$-$V_{BATT}$) between the adapter voltage $V_{ADP}$ and the battery voltage $V_{BATT}$ is lower than a necessary minimum voltage $\Delta V$. In this event, it is impossible to flow the charging current Ic and the charging current Ic drastically decreases. When the $-\Delta I$ detection circuit 45 detects that the charging current Ic is less than the set current value due to a drastic decrease of the charging current Ic, the $-\Delta I$ detection circuit 45 supplies the detected signal to the second reference voltage generating circuit 44A. Responsive to the detected signal, the second reference voltage generating circuit 44A heightens the second reference voltage once by the predetermined voltage. Responsive to a rise of the second reference voltage, the voltage control circuit 42A operates so as to make the adapter voltage $V_{ADP}$ heighten by the predetermined voltage once.

Thereafter, by repeating this operation, a charging of the secondary battery 21 is carried out. As a result, it is possible to always hold the necessary minimum voltage difference $\Delta V$. In the example being illustrated, a repetition period is, for example, equal to about 100 milliseconds, the predetermined voltage is, for example, about 100 millivolts. In addition, a value of the drastic decrease of the charging current Ic is, for example, lied in a range between 30 milliamperes and 50 milliamperes.

Although the adapter voltage $V_{ADP}$ has a defined voltage value in the constant voltage charging region in the conventional AC adapter 10 (see FIG. 4), the AC adapter 10A according to this embodiment charges the secondary battery 21 by regulating the necessary minimum voltage difference $\Delta V$ at any time. As a result, in the AC adapter 10A according to this embodiment, a jump of the adapter voltage $V_{ADP}$ does not occurs on shifting from the constant current charging region to the constant voltage charging region that is trouble in the conventional AC adapter 10. In other words, the AC adapter 10A according to this embodiment carries out a constant voltage charging with the necessary minimum voltage difference $\Delta V$ which is the potential difference ($V_{ADP}$-$V_{BATT}$) between the adapter voltage $V_{ADP}$ and the battery voltage $V_{BATT}$ on the constant current charging. As a result, it is possible to lower generation of heat in the charging control element Q within the main body 20.

While this invention has thus far been described in conjunction with a preferred embodiment thereof, it will now be readily possible for those skilled in the art to put this invention into various other manners. For example, although the description has been made about an example in a case where this invention is applied to the AC adapter for the portable telephone set in the above-mentioned embodiment, this invention may be applied to an AC adapter for supplying power to a charging circuit except for the portable telephone set.

A gist of this invention is a method comprising the steps of heightening or lowering the adapter voltage $V_{ADP}$ of the AC adapter and of controlling the adapter voltage $V_{ADP}$ by feeding a variation of the charging current Ic back. Although the description has been made about the method of changing the reference voltage for supplying to the voltage control circuit 42A, the adapter voltage $V_{ADP}$ may be changed by changing a ratio R3/R4 of a resistance value of the third resistor R3 and a resistance value of the fourth resistor R4 with the reference voltage fixed. Although the above-mentioned embodiment describes a method of detecting that the charging current Ic drastically decreases by gradually lowering the adapter voltage $V_{ADP}$, this invention may use a method of detecting that the charging current Ic drastically increases by gradually heightening the adapter voltage $V_{ADP}$.

What is claimed is:

1. An AC adapter for use in charging a secondary battery which is contained in or mounted on a main body, said AC adapter comprising:
   a primary side circuit for turning, by using a switching element, an input DC voltage applied to a primary winding of a transformer on and off;
   a secondary side circuit for rectifying and smoothing an AC voltage induced in a secondary winding of said transformer to produce an adapter voltage;
   a voltage control circuit for detecting a variation of said adapter voltage to produce a voltage control signal;
   a constant current control circuit for detecting a charging current flowing in said secondary side circuit to produce a constant current control signal;
   a photocoupler for feeding said voltage control signal and said constant current control signal as a feedback signal back to said primary side circuit;
   a switching control circuit for controlling, in response to said feedback signal, on and off of said switching element; and
   detection means, disposed in said secondary side circuit, for detecting when said charging current decreases to less than a set current value due to a drastic decrease of said charging current to produce a detected signals;
   wherein said voltage control circuit repeats operations comprising gradually lowering said adapter voltage and increasing, in response to said detected signal, said adapter voltage by a predetermined voltage, so that said AC adapter carries out a constant voltage charging with a necessary minimum voltage difference which is a potential difference between said adapter voltage and a battery voltage of said secondary battery on a constant current charging.

2. An AC adapter as claimed in claim 1, wherein said main body comprises a portable telephone set.

3. An AC adapter as claimed in claim 1, wherein said predetermined voltage is equal to 100 millivolts.

4. An AC adapter as claimed in claim 1, further comprising a reference voltage generating circuit for supplying a reference voltage to said voltage control circuit, said voltage control circuit controlling said adapter voltage so as to change said adapter voltage by changing said reference voltage by said reference voltage generating circuit.

5. An AC adapter as claimed in claim 4, wherein said main body comprises a portable telephone set.

6. A method of charging, by using an adapter voltage, a secondary battery which is contained in or mounted on a main body, said method comprising the steps of:
   a) gradually lowering said adapter voltage;
   b) increasing said adapter voltage by a predetermined voltage when a charging current flowing through said secondary battery is less than a set current value due to a drastic decrease of the charging current; and
   c) repeating said steps a) and b), whereby constant voltage charging is carried out with a necessary minimum voltage difference which is a potential difference between the adapter voltage and a battery voltage of the secondary battery on a constant current charging.

7. A method as claimed in claim 6, wherein said predetermined voltage is equal to 100 millivolts.

* * * * *